(12) United States Patent
Kean

(10) Patent No.: US 12,381,475 B2
(45) Date of Patent: Aug. 5, 2025

(54) POWER FILTRATION SYSTEM

(71) Applicant: Blue Origin Manufacturing, LLC, Huntsville, AL (US)

(72) Inventor: Johnny Ryan Kean, Grandview, MO (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 394 days.

(21) Appl. No.: 17/737,200

(22) Filed: May 5, 2022

(65) Prior Publication Data

US 2022/0360162 A1 Nov. 10, 2022

Related U.S. Application Data

(60) Provisional application No. 63/184,988, filed on May 6, 2021.

(51) Int. Cl.
*H02M 1/12* (2006.01)
*H02J 1/10* (2006.01)
(Continued)

(52) U.S. Cl.
CPC ............. *H02M 1/123* (2021.05); *H02J 1/106* (2020.01); *H02J 1/14* (2013.01); *H02J 7/00712* (2020.01);
(Continued)

(58) Field of Classification Search
CPC ........ H02M 1/12; H02M 1/123; H02M 3/156; H02M 3/157; H02M 3/158; H02M 7/06;
(Continued)

(56) References Cited

U.S. PATENT DOCUMENTS 8,270,188 B1 9/2012 Kim
9,455,646 B2 9/2016 Zhou et al.
(Continued)

FOREIGN PATENT DOCUMENTS

DE 102021110573 A1 * 10/2021 ............. H02M 1/44
EP 1 143 602 A2 10/2001
(Continued)

OTHER PUBLICATIONS

Karampatea, Apostolia; Katherine Siakavara; "Synthesis of Rectenna for Powering Micro-Watt Sensors by Harvesting Ambient RF Signals' Power"; Oct. 1, 2019; Radiocommunications Lab and School of Physics, Aristotle University of Thessaloniki; pp. 1-18 (Year: 2019).*
International Search Report and Written Opinion in corresponding PCT/US2022/027775, dated Aug. 23, 2022.
Extended European Search Report dated Jan. 30, 2025 in European Application No. 22799553.7, in 10 pages.

*Primary Examiner* — Thienvu V Tran
*Assistant Examiner* — Shahzeb K Ahmad
(74) *Attorney, Agent, or Firm* — Knobbe, Martens, Olson & Bear, LLP

(57) ABSTRACT

A power filtration system filters out a common mode signal from a DC conductor of a power system. The power filtration system comprises a first filter and at least one of a load or a power circuit. The first filter is connected to the DC conductor and configured to pass the common mode signal. The load is configured to dissipate the energy of the common mode signal. The power circuit is configured to conduct the common mode signal to an energy storage device.

16 Claims, 3 Drawing Sheets

(51) Int. Cl.
*H02J 1/14* (2006.01)
*H02J 7/00* (2006.01)
*H02J 7/02* (2016.01)
*H02M 1/10* (2006.01)
*H02M 1/44* (2007.01)
*H02M 3/157* (2006.01)
*H02M 7/06* (2006.01)
*H02M 7/219* (2006.01)

(52) U.S. Cl.
CPC ............... *H02J 7/02* (2013.01); *H02M 1/12* (2013.01); *H02M 1/44* (2013.01); *H02M 3/157* (2013.01); *H02M 7/06* (2013.01); *H02M 7/219* (2013.01)

(58) Field of Classification Search
CPC .......... H02M 7/12; H02M 7/155; H02M 7/21; H02M 7/217; H02M 7/219; H02J 1/106; H02J 1/14; H02J 7/00712; H02J 7/02
See application file for complete search history.

(56) References Cited

U.S. PATENT DOCUMENTS

| | | | |
|---|---|---|---|
| 9,653,919 | B2 | 5/2017 | Oswald |
| 2010/0060181 | A1 | 3/2010 | Choi et al. |
| 2010/0080028 | A1 | 4/2010 | Cheng et al. |
| 2016/0126849 | A1* | 5/2016 | Pietrantonio ..... H02M 3/33546 363/21.04 |
| 2017/0047881 | A1 | 2/2017 | Shimura et al. |
| 2018/0241313 | A1* | 8/2018 | Goto ................. H02M 3/33592 |
| 2018/0278161 | A1 | 9/2018 | Dilley et al. |
| 2019/0067802 | A1* | 2/2019 | Carter ................... H01Q 9/045 |
| 2023/0364431 | A1* | 11/2023 | Andreu .............. A61N 1/37223 |

FOREIGN PATENT DOCUMENTS

| | | |
|---|---|---|
| EP | 2 720 367 A2 | 4/2014 |
| GB | 2 544 820 A | 5/2017 |

\* cited by examiner

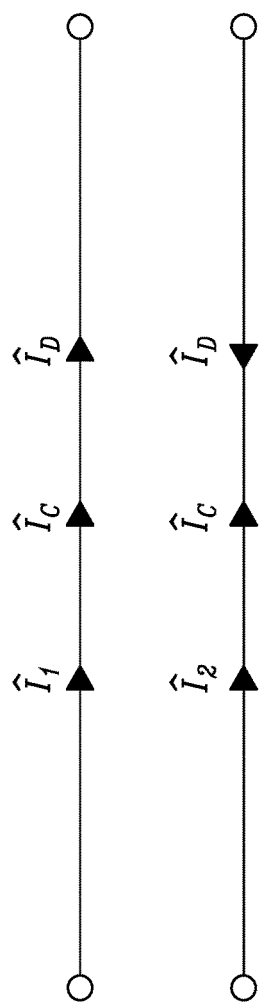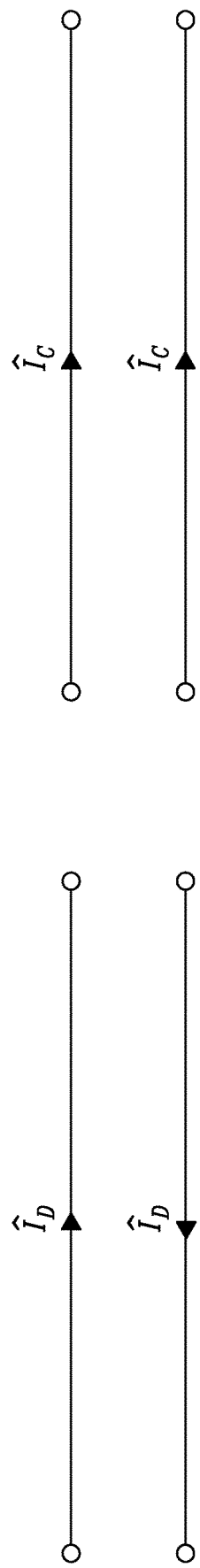
Fig. 1.
Fig. 2A.
Fig. 2B.

POWER FILTRATION SYSTEM

RELATED APPLICATIONS

The present application claims priority of U.S. Provisional Patent Application Ser. No. 63/184,988 filed on May 6, 2021, and entitled "POWER FILTRATION SYSTEM," which is hereby incorporated in its entirety by reference herein.

BACKGROUND

In electromagnetic compatibility (EMC), two types of currents that are often tracked are differential mode currents and common mode currents. Common mode currents are portions of conductor currents that are unmatched with exact opposite and equal magnitude currents. Common mode currents are characterized as parasitic and form between a desired circuit path and structural components of the circuit. The signals or power of common mode currents propagate in the same direction in the same circuit. Differential mode currents exist where their signals or power propagate through a conductor and return via the intended paths and flow in opposite directions to each other. Differential mode currents are the result of normal operation of a circuit and result from electric current flowing around loops formed by the electrical conductors of the circuit.

Many electrical systems contain elements that are capable of behaving like antennas in that they are capable of unintentionally emitting radio frequency energy through electric, magnetic, and/or electromagnetic means. Common mode coupling as well as differential mode coupling can occur via both conduction and radiation. In power switching devices, common mode currents are an unwanted noise and often cause multi-conductors to act or behave like a single conductor.

Current solutions for getting rid of common mode currents in power systems include using Y-capacitors or common mode chokes. However, adding Y capacitance to a DC bus side is often unacceptable for drive manufacturers or integrators. As the common mode is decreased on the DC side, energy is added to the chassis, which causes an increase in the harmonic content on the AC or house side. The AC or house grid must meet regulatory requirements, which include certain maximums in terms of energy or harmonic content. In the power switching of drives (both with transformer and transformer-less), Y-type capacitors can help the DC side of the switches, but noise increases on the AC side as a consequence of sending all the common mode current to a chassis or ground. Additionally, chokes have a limited and oftentimes insufficient amounts of dampening. Further, in some applications, Y-capacitors cannot be used to dissipate common mode noise on a vessel or watercraft.

The background discussion is intended to provide information related to the present invention which is not necessarily prior art.

SUMMARY OF THE INVENTION

The present invention solves the above-described problems and other problems by providing a power filtration system, a method of filtering common mode signals, and power systems that reduce common mode noise without increasing harmonic content.

A power filtration system constructed according to an embodiment of the present invention filters out a common mode signal from a DC conductor of a power system. The power filtration system comprises a first filter and at least one of a load or a power circuit. The first filter is connected to the DC conductor and configured to pass the common mode signal.

The load is configured to dissipate the energy of the common mode signal. The power circuit is configured to conduct the common mode signal to an energy storage device. By dissipating or capturing the energy of the common mode signal, the power provided by the power system will have minimal common mode signals or harmonic content on an AC load. Further, the common mode signals can be harnessed to improve efficiency.

A method of filtering a common mode signal flowing through a DC conductor of a power system according to an embodiment of the invention comprises filtering the common mode signal from the DC conductor via a first filter circuit so that the common mode signal passes through the first filter circuit; and conducting the common mode signal from the first filter circuit to at least one of a load or an energy storage device.

A power system constructed according to an embodiment of the present invention broadly comprises an energy storage device, a conductor, and a power filtration system. The conductor is connected to the energy storage device.

The power filtration system filters out a common mode signal from the conductor and comprises a common mode filter circuit, a rectifier circuit, a smoothing filter circuit, and a power circuit. The common mode filter circuit is connected to the conductor and is configured to pass the common mode signal. The rectifier circuit is connected to the filter circuit and is configured to rectify the common mode signal from the first filter to produce a rectified signal. The smoothing filter circuit is connected to the rectifier circuit and is configured to smooth the rectified signal to produce a generally DC signal. The power circuit is connected to the smoothing filter and is configured to conduct the DC signal to the energy storage device.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 1 is a schematic diagram of a pair of conductors demonstrating common mode and differential mode currents;

FIG. 2A is a schematic diagram depicting components of the differential mode currents;

FIG. 2B is a schematic diagram depicting components of the common mode currents;

Figure 3:
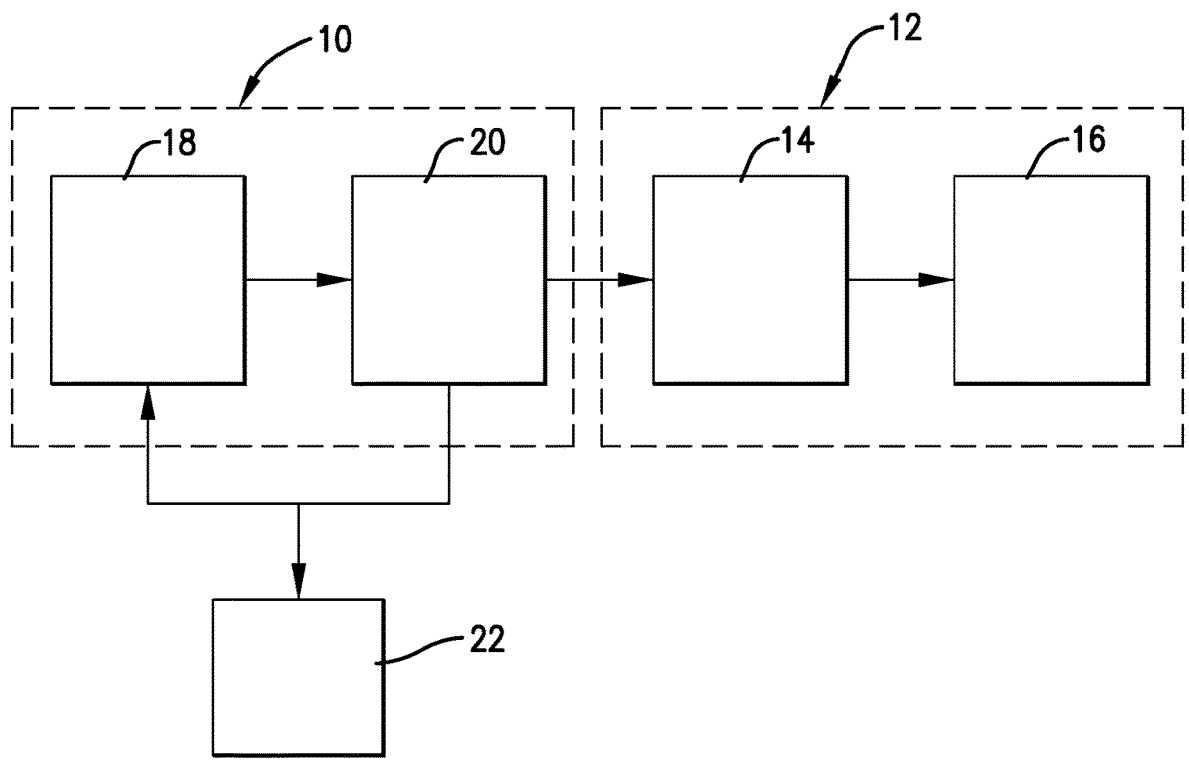
FIG. 3 is a block diagram depicting selected components of a power system constructed in accordance with an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIG. 1, a simple illustration of common mode and differential mode currents is depicted. Currents $\hat{I}1$ and $\hat{I}2$ are flowing on a pair of conductors. The currents can be decomposed into common mode and differential mode currents. The relations between $\hat{I}1$, $\hat{I}2$, and the modal currents are given below in Equations 1 and 2.

$$\hat{I}1 = \hat{I}C + \hat{I}D \quad (1)$$

$$\hat{I}2 = \hat{I}C - \hat{I}D \quad (2)$$

From the above equations, the modal currents can be characterized as shown in Equations 3 and 4 below.

$$\hat{I}D = \frac{1}{2}(\hat{I}1 - \hat{I}2) \quad (3)$$

$$\hat{I}C = \frac{1}{2}(\hat{I}1 + \hat{I}2) \quad (4)$$

The common mode current flows in each conductor and is equal in magnitude and direction, while the differential mode current has equal magnitude but is directed in different directions.

Turning to FIGS. 2A and 2B, the radiated electric field from both conductors can be superimposed to obtain the total radiated electric field. For differential mode current, since the conductors are not located in close vicinity, the fields do not exactly cancel each other, but the resultant is a small net radiated electric field. In contrast to differential mode current, common mode current is directed in the same direction and results in a much higher electric field because fields from both conductors will be added. Thus, a small common mode current has a much higher potential towards producing radiated emissions compared to differential mode current. For conducted interference, if the interference does not appear between conductors, it will appear between each conductor to a third reference point, such as a structure near the conductor.

Conducted common mode interference causes more problems compared to differential mode interference because of the possible third reference point that could include any structure that is normally not designed for the purpose. Therefore, common mode current is difficult to be predicted and controlled, the interference varies with time because of the uncontrolled structural changes, common mode current can pollute a variety of unrelated equipment, and the common mode current can flow within a large and uncontrolled loop, thereby increasing potential for radiated coupling. In kilowatt drive systems, inventors have found that common mode voltages can swing into the thousands of volts and that there is enough energy in the harmonics and overshoots to be in the kilowatts.

In studying the common mode noise waveform from DC rails to chassis, the inventors noticed that the waveform appeared to be an AC waveform. Turning to FIG. 3, an exemplary power system 10 is illustrated in which embodiments of the prevent invention may be implemented. The illustrated power system 10 may be rated for any number of voltages, currents, powers, etc. and may be configured to supply power to a load 12, such as a DC to AC converter 14 and a motor 16. The power system 10 may comprise an energy storage device 18 and a power filtration system 20. The energy storage device 18 may comprise one or more battery cells, capacitors, or the like and be configured to supply generally DC power to the load 12. The power filtration system 20 is configured to remove common mode signals from the power provided by the energy storage device 18 and dissipate the energy of the common mode signals via a resistive load and/or conduct the common mode signals back to the energy storage device 18 and/or an external energy storage device 22. Thus, the energy of the common mode signals that would be sent to chassis ground through a Y-capacitor is sent to the power filtration system 20 instead, which reduces the common mode current on the DC conductor of the power system 10 without causing distortion or common mode signal rise on the AC side of the drive, or load 12. While the power filtration system 20 is depicted as coupled to DC energy storage devices 18, 22, the power filtration system 20 can be used with any system having a DC conductor without departing from the scope of the present invention.

Figure 4:
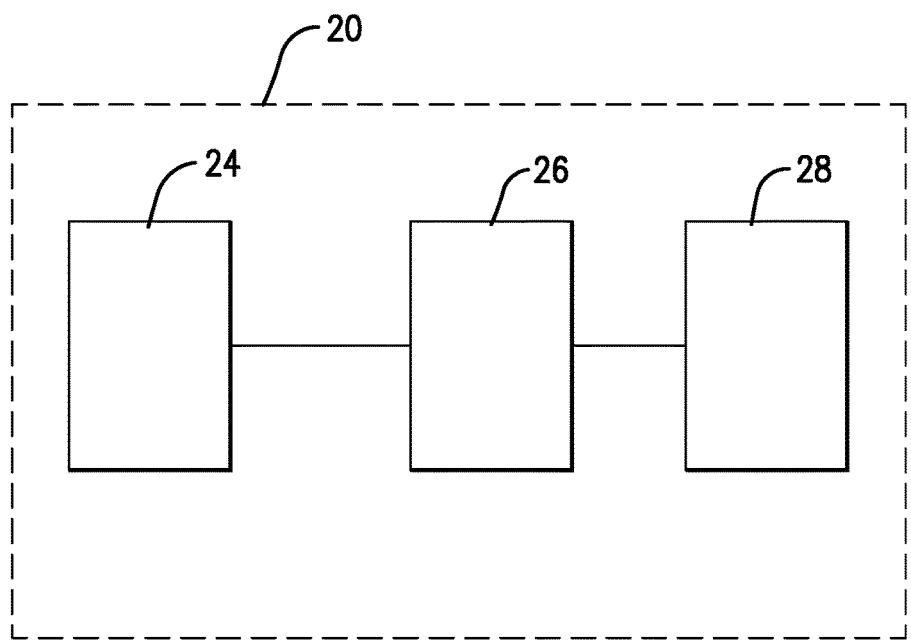
FIG. 4 is a block diagram depicting selected components of a power filtration system of the power system of FIG. 3.

Turning to FIG. 4, the filtration system 20 may comprise a filter circuit 24, a rectifier and smoothing circuit 26, and a power circuit or load 28. The filter circuit 24 is configured to filter out the common mode signals from the power provided by the energy storage device 18. In some embodiments, the filter circuit 24 may also be configured to filter out signals having a frequency above a certain threshold, such as a frequency above known common mode signal frequencies. The filter circuit 24 may comprise any number of passive or active components, including capacitors, inductors, resistors, semiconductors, diodes, transistors, or the like.

The rectifier and smoothing circuit 26 may be configured to rectify and smooth the common mode signals passed through the filter circuit 24. The rectifier and smoothing circuit 26 may comprise any number of passive or active components, including capacitors, inductors, resistors, semiconductors, diodes, transistors, or the like. In some embodiments, the rectifier and smoothing circuit 26 comprises one or more silicon carbide rectifiers for power and speed.

The power circuit or load 28 is configured to conduct the rectified and smoothed signal from the rectifier and smoothing circuit 26 to the energy storage device 18 and/or the external energy storage device 22. In some embodiments involving lower power applications, the power circuit or load 28 may just be a load configured to dissipate the signal, such as an electrically resistive element. The power circuit or load 28 may comprise a DC to DC converter for adjusting the rectified and smoothed signal from the rectifier and smoothing circuit 26.

Figure 5:
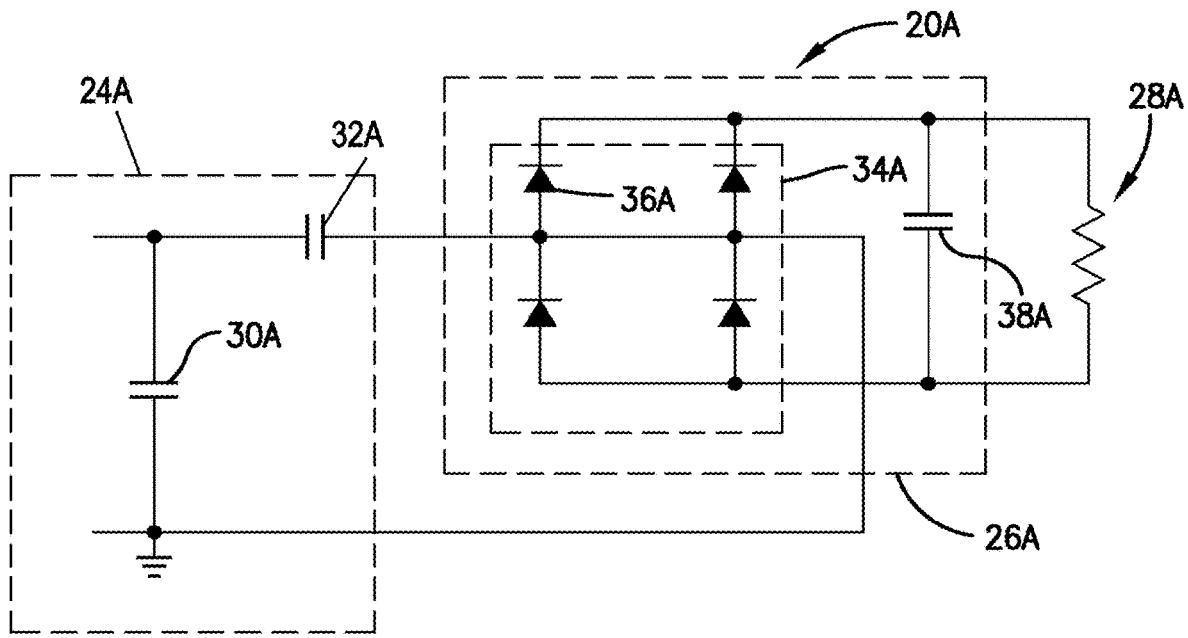
FIG. 5 is an exemplary schematic diagram of the power filtration system of FIG. 4.

Turning to FIG. 5, an exemplary configuration of an embodiment of the filtration system 20 is depicted. The exemplary configuration of the power system 20A comprises a filter circuit 24A, a rectifier and smoothing circuit 26A, and a power circuit 28A. The filter circuit 24A may include a high pass filter 30A, such as one or more capacitors with a capacitance operable to pass signals above a frequency threshold to ground. The filter circuit 24A may also include a common mode filter 32A configured to pass common mode signals to the rectifier and smoothing circuit 26A. The common mode filter 32A may comprise, for example, a capacitor having a capacitance operable to pass the common mode signals.

The rectifier and smoothing circuit 26A may comprise a full bridge rectifier 34A comprising, for example, a plurality of diodes 36A. The rectifier 34A may be configured to rectify the common mode signals. In some embodiments, the rectifier 34A may be a silicon carbide rectifier. The rectifier and smoothing circuit 26A may also include a smoothing filter circuit 38A configured to smooth the rectified signal from the rectifier 34A to produce a generally DC signal having a first voltage. The smoothing filter circuit 38A may include a capacitor having a capacitance operable to smooth the rectified signal.

The power circuit 28A, represented by a resistor, is operable to dissipate the rectified and smoothed signal and/or conduct the rectified and smoothed signal to one of the energy storage devices 18, 22. The power circuit 28A in FIG. 5 is depicted for simplicity sake as a shunt load, and the amount of current has a wide level of adjustment. However, the power circuit 28A may comprise a DC to DC converter configured to convert the signal from the first voltage to a second voltage appropriate for charging one of the energy storage devices 18, 22. The power circuit 28A may comprise any type of load or power conditioning circuit without departing from the scope of the present invention.

Figure 6:
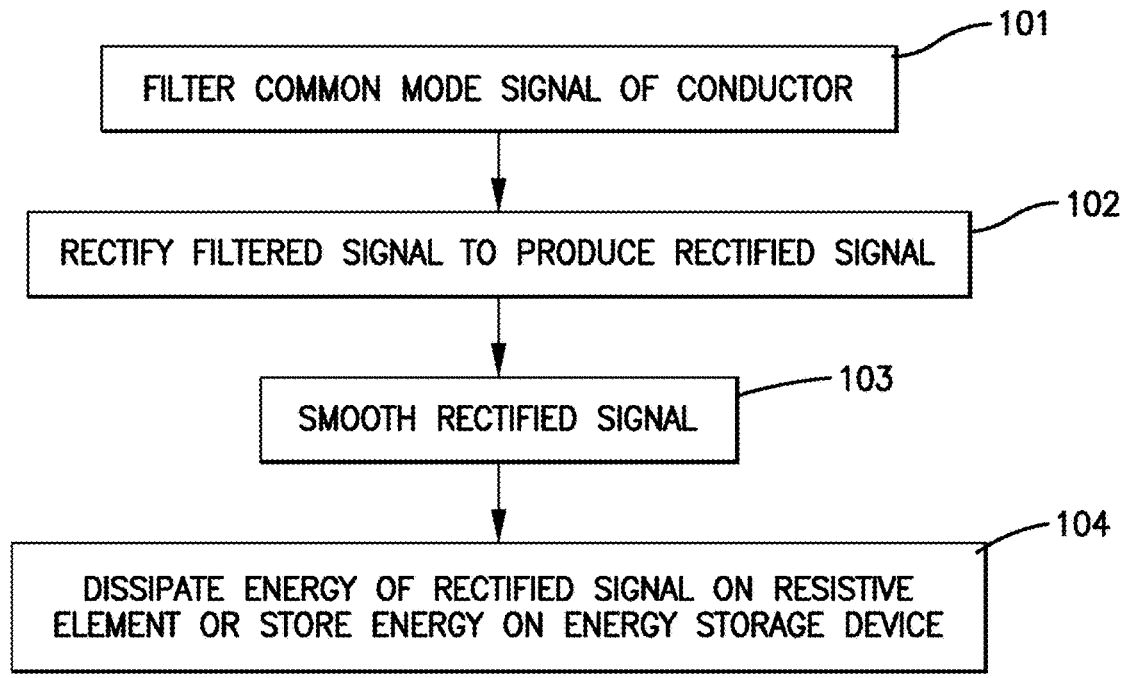
FIG. 6 is a flowchart depicting exemplary steps of a method according to an embodiment of the present invention.

The flow chart of FIG. 6 depicts the steps of an exemplary method 100 of filtering common mode signals flowing through a conductor of a power system. In some alternative implementations, the functions noted in the various blocks may occur out of the order depicted in FIG. 6. For example, two blocks shown in succession in FIG. 6 may in fact be executed substantially concurrently, or the blocks may sometimes be executed in the reverse order depending upon the functionality involved. In addition, some steps may be optional.

Referring to step 101, the common mode signal is filtered from a conductor of a power system via a first filter circuit so that the common mode signal passes through the first filter circuit. The conductor may be part of a DC portion of the power system. In some embodiments, this step may include filtering, via a second filter circuit, signals having a frequency higher than a frequency of the common mode signal from the conductor. The high frequency signals may be passed to ground.

Referring to step 102, the common mode signal that passes through the first filter is rectified, via a rectifier circuit, to produce a rectified signal. In some embodiments, the rectifier circuit may comprise a full bridge rectifier and/or a silicon carbide rectifier.

Referring to step 103, the rectified signal is smoothed, via a smoothing filter circuit, to produce a generally DC signal having a first voltage. The smoothing filter circuit may include one or more capacitors with capacitances operable to smooth the waveform of the rectified signal.

Referring to step 104, the common mode signal is conducted to a load or an energy storage device. The load may be a resistive element operable to dissipate the energy of the common mode signal. The energy storage device may be part of the power system and/or an external energy storage device. In some embodiments, this step includes converting, via a DC to DC converter, the generally DC rectified and smoothed signal to a second generally DC signal with a second voltage. The second voltage may be a charging voltage for at least one of the energy storage devices.

The method 100 may include additional, less, or alternate steps and/or device(s), including those discussed elsewhere herein.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim (s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A power filtration system configured to filter out a common mode signal from a power provided by an energy storage device, the power filtration system comprising: a filter circuit connected to the energy storage device and comprising a first filter configured to pass the common mode signal; a rectifier circuit configured to rectify the common mode signal from the first filter to produce a rectified common mode signal; and at least one of a resistive load configured to dissipate energy of the rectified common mode signal or a power circuit configured to conduct the rectified common mode signal back to the energy storage device or to an external energy storage device, wherein the filter circuit further comprises a second filter configured to pass signals having a frequency higher than a threshold frequency to ground, the threshold frequency being a frequency of the common mode signal.

2. The power filtration system of claim 1, further comprising a smoothing filter circuit connected to the rectifier circuit and configured to smooth the rectified common mode signal to produce a DC signal having a first voltage.

3. The power filtration system of claim 2, wherein the power circuit comprises a DC to DC converter connected to the smoothing filter circuit and configured to convert the DC signal to a second DC signal with a second voltage.

4. The power filtration system of claim 3, wherein the second voltage is a charging voltage of the energy storage device.

5. The power filtration system of claim 1, wherein the rectifier circuit comprises a full bridge rectifier.

6. The power filtration system of claim 1, wherein the energy storage device comprises one or more battery cells.

7. The power filtration system of claim 1, wherein the first filter comprises one or more capacitors.

8. The power filtration system of claim 1, wherein the rectifier circuit comprises one or more silicon carbide rectifiers.

9. A method of filtering a common mode signal from a power provided by an energy storage device, the method comprising: filtering the common mode signal from the power provided by the energy storage device via a filter circuit comprising a first filter so that the common mode signal passes through the filter circuit; rectifying, via a rectifier circuit, the common mode signal that passes through the filter circuit to produce a rectified common mode signal; and conducting the rectified common mode signal from the rectifier circuit to at least one of a resistive load or back to the energy storage device or to an external energy storage device, wherein the filter circuit further comprises a second filter configured to pass signals having a frequency higher than a threshold frequency to ground, the threshold frequency being a frequency of the common mode signal.

10. The method of claim 9, wherein the energy storage device is part of a power system.

11. The method of claim 10, further comprising smoothing, via a smoothing filter circuit, the rectified common mode signal to produce a DC signal having a first voltage.

12. The method of claim 11, further comprising converting, via a DC to DC converter connected to the smoothing filter circuit, the DC signal to a second DC signal with a second voltage.

13. The method of claim 10, wherein the rectifier circuit comprises a full bridge silicon carbide rectifier.

14. A power system comprising: an energy storage device; a conductor connected to the energy storage device; and a power filtration system configured to filter out a common mode signal from the conductor and comprising: a filter circuit connected to the conductor and comprising a first filter configured to pass the common mode signal; a rectifier circuit connected to the filter circuit and configured to rectify the common mode signal from the first filter to produce a rectified common mode signal; a smoothing filter circuit connected to the rectifier circuit and configured to smooth the rectified common mode signal to produce a DC signal; and a power circuit connected to the smoothing filter circuit and configured to conduct the DC signal to the energy storage device, wherein the filter circuit further comprises a second filter configured to pass signals above a threshold frequency to ground, the threshold frequency being a frequency of the common mode signal.

15. The power system of claim 14, wherein the power circuit comprises a DC to DC converter configured to convert the DC signal to a second DC signal at a desired voltage.

16. The power system of claim 14, wherein the energy storage device comprises one or more battery cells.

* * * * *